United States Patent
Johnson

(10) Patent No.: US 8,522,960 B2
(45) Date of Patent: Sep. 3, 2013

(54) SPIRAL BELT CONVEYOR

(75) Inventor: Matthew J. Johnson, Meridian, ID (US)

(73) Assignee: Laitram, L.L.C., Harahan, LA (US)

( * ) Notice: Subject to any disclaimer, the term of this patent is extended or adjusted under 35 U.S.C. 154(b) by 194 days.

(21) Appl. No.: 13/122,183

(22) PCT Filed: Aug. 6, 2009

(86) PCT No.: PCT/US2009/052927
§ 371 (c)(1),
(2), (4) Date: Apr. 1, 2011

(87) PCT Pub. No.: WO2010/047867
PCT Pub. Date: Apr. 29, 2010

(65) Prior Publication Data
US 2011/0174596 A1    Jul. 21, 2011

Related U.S. Application Data

(60) Provisional application No. 61/136,995, filed on Oct. 21, 2008.

(51) Int. Cl.
*B65G 21/08* (2006.01)

(52) U.S. Cl.
USPC .......................................... 198/778; 198/849

(58) Field of Classification Search
USPC ................. 198/778, 831, 848, 849
See application file for complete search history.

(56) References Cited

U.S. PATENT DOCUMENTS

| | | | |
|---|---|---|---|
| 3,664,487 A * | 5/1972 | Ballenger | 198/778 |
| 4,036,352 A * | 7/1977 | White | 198/778 |
| 4,292,014 A * | 9/1981 | Lupke et al. | 425/72.1 |
| 4,981,208 A * | 1/1991 | Jones | 198/778 |
| 5,613,591 A | 3/1997 | Heit et al. | |
| 5,724,785 A | 3/1998 | Malanowski | |
| 5,743,376 A | 4/1998 | Ochs | |
| 6,394,261 B1 * | 5/2002 | DeGennaro | 198/815 |
| 6,523,677 B1 * | 2/2003 | DeGennaro et al. | 198/778 |
| 6,550,602 B2 * | 4/2003 | Steeber et al. | 198/347.4 |

(Continued)

FOREIGN PATENT DOCUMENTS

| | | |
|---|---|---|
| EP | 0738478 A | 10/1996 |
| JP | 4217504 A | 8/1992 |
| NL | 2000324 C1 | 12/2006 |
| WO | 2010130716 A1 | 11/2010 |

OTHER PUBLICATIONS

Alto Heli-Matic Spiral Conveyor brochure, Stewart Systems, Plano, Texas, 1981.

*Primary Examiner* — Patrick Mackey
(74) *Attorney, Agent, or Firm* — James T. Cronvich

(57) ABSTRACT

The spiral belt conveyor is a conveyor belt system for transporting articles vertically along a helical path. The spiral belt conveyor includes a platform and a central frame structure extending upwardly from the platform. Two idler rollers are mounted on the platform. A helical track having an inner portion and an outer portion is concentrically disposed around the shaft. The inner portion of the helical track has a first radius, and the outer portion thereof has a second radius greater than the first radius. An upper end of the inner portion of the helical track meets an upper end of the outer portion of the helical track adjacent an upper end of the central frame structure. A conveyor belt is mounted on the helical track and the pair of idler rollers.

15 Claims, 8 Drawing Sheets

(56) References Cited

U.S. PATENT DOCUMENTS

| 7,191,896 | B2 * | 3/2007 | Hartness et al. | 198/594 |
| 7,222,714 | B2 | 5/2007 | Lilly | |
| 8,302,764 | B2 * | 11/2012 | Johnson | 198/778 |
| 2012/0043182 | A1 * | 2/2012 | Balk et al. | 198/604 |

* cited by examiner

SPIRAL BELT CONVEYOR

BACKGROUND OF THE INVENTION

The present invention relates to conveyors and particularly to a spiral belt conveyor for transporting articles vertically along a substantially helical path.

Conveyor belts are typically used for conveying bulk material, such as foodstuffs or other materials, that must be transported through a cooled or refrigerated environment. Typical conveyor belts have the advantage that relatively little energy is required for transporting the bulk material across horizontal surfaces. The conveyance of bulk material, however, is limited by such systems to horizontal routes or to routes with only relatively small inclines. To overcome greater heights or inclines, it is necessary to transfer the bulk material to another conveyor system, for example, a bucket chain conveyor. In the transport of material to be refrigerated, it is often desirable to maximize the time of transport within the cooled environment. It would be desirable to provide a conveyor belt system that transports goods along an extended path.

SUMMARY OF THE INVENTION

A spiral belt conveyor is a conveyor belt system for transporting articles vertically along a substantially helical path. One version of a spiral belt conveyor embodying features of the invention comprises an upwardly extending central frame structure having an upper end and a lower end. A helical track is concentrically disposed around the central frame structure. The helical track defines an inner helical path and an outer helical path. The inner helical path has a smaller radius than the outer helical path, and each of the inner and outer helical paths has an upper end and a lower end. The upper ends meet at the upper end of the central frame structure. A first linear track segment leads to the helical track at the lower end of the inner helical path, and a second linear track segment leads to the helical track at the lower end of the outer helical path. The first and second linear track segments are collinear in a vertical projection. At least one conveyor belt is mounted on the helical track and the first and second linear track segments. At least one drive unit, disposed in line with the first and second linear track segments, drives the conveyor belt upward or downward on the inner helical path and oppositely on the outer helical path.

Another version of the spiral belt conveyor includes a platform and a central frame structure extending upwardly from the upper surface of the platform. Two idler rollers are mounted on the upper surface of the platform. A helical track having an inner helical path and an outer helical path is concentrically disposed around the central frame structure. The inner helical path of the helical track has a first radius, and the outer helical path of the helical track has a second radius. The second radius is greater than the first radius. Furthermore, an upper end of the inner helical path of the helical track is joined to an upper end of the outer helical path of the helical track adjacent an upper end of the central frame structure, thus forming a continuous path between the upper ends of the inner and outer portions. A conveyor belt is mounted on the helical track and the pair of rollers. The conveyor belt is driven by a belt drive unit so that an article positioned on the conveyor belt adjacent the upper surface of the support follows an upwardly driven helical path about the inner helical path of the helical track until reaching its upper end, and then follows a downwardly driven helical path about the outer helical path of the helical track.

Alternatively, the single helical track may be replaced by an inner helical track and an outer helical track, with both the inner and outer helical tracks being mounted on the central frame structure. The inner helical track has a first radius, and the outer helical track has a second radius, with the second radius being greater than the first radius. An upper end of the inner helical track meets an upper end of the outer helical track adjacent an upper end of the central frame structure. In this alternative embodiment, first and second conveyor belts are mounted on the inner and outer helical tracks, respectively, and on the pair of rollers. The first and second conveyor belts are each driven by first and second drive units so that an article positioned on the first conveyor belt adjacent the upper surface of the support follows an upwardly driven helical path along the inner helical track until reaching the upper end thereof, and then follows a downwardly driven helical path along the outer helical track.

These and other features of the present invention will become readily apparent upon further review of the following specification and drawings.

BRIEF DESCRIPTION OF THE DRAWINGS

Similar reference characters denote corresponding features consistently throughout the drawings.

DETAILED DESCRIPTION OF THE PREFERRED EMBODIMENTS

Figure 1:
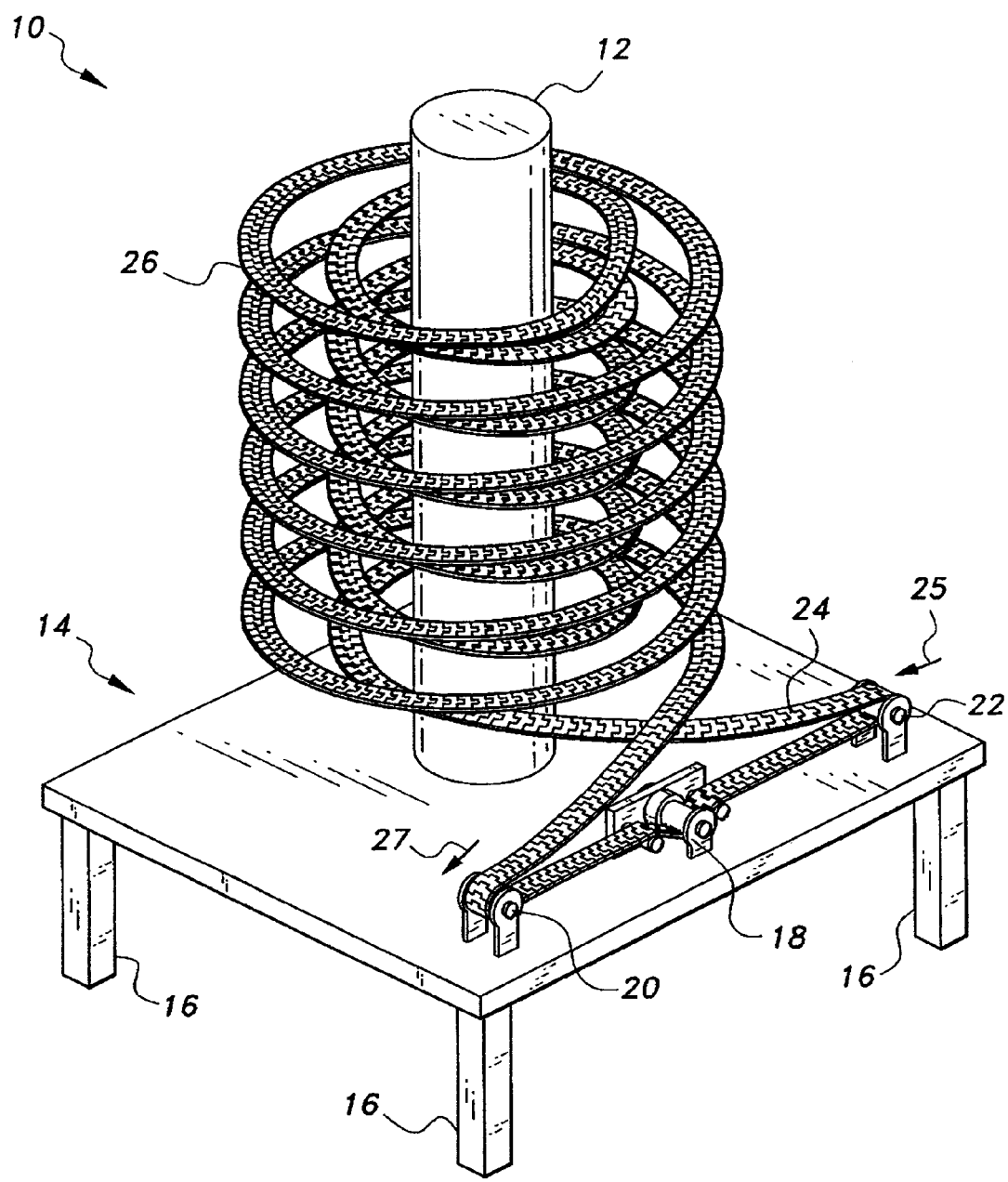
FIG. 1 is a perspective view of a spiral belt conveyor according to the present invention.
Figure 2:
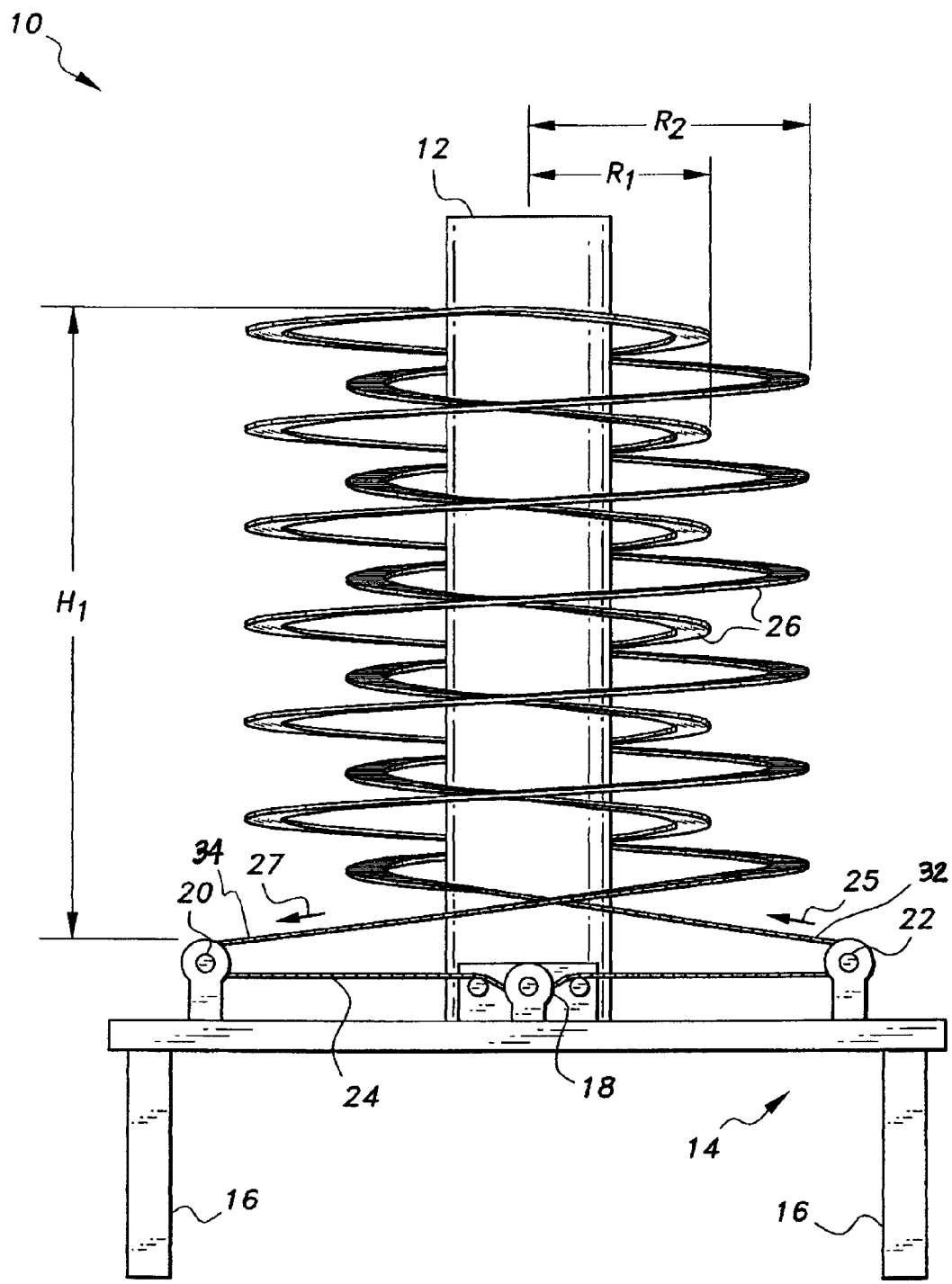
FIG. 2 is a side view of the spiral belt conveyor according to the present invention.

As best shown in FIGS. 1 and 2, the spiral belt conveyor 10 conveys articles vertically along a substantially helical path. As the articles are being raised vertically, the articles are conveyed along a substantially helical route having a first radius $R_1$ (as shown in FIG. 2). Once the articles have reached a maximum height, the articles are conveyed downwardly, following a substantially helical route having a second radius $R_2$, with $R_2$ being greater than $R_1$. The spiral belt conveyor 10 may be used within a refrigerator or cooler, for example, providing the articles with an extended route for cooling.

As best shown in FIG. 2, the spiral belt conveyor 10 is supported on a platform 14. The platform 14 may be raised above the floor or other supporting surface by a plurality of support legs 16, as shown. A central frame structure 12 is rigidly mounted on and extends upwardly from the platform 14. The central frame structure 12 is shown as a shaft having a height $H_1$ that defines the maximum height above the platform 14 that articles on the conveyor 10 can reach.

Figure 3:
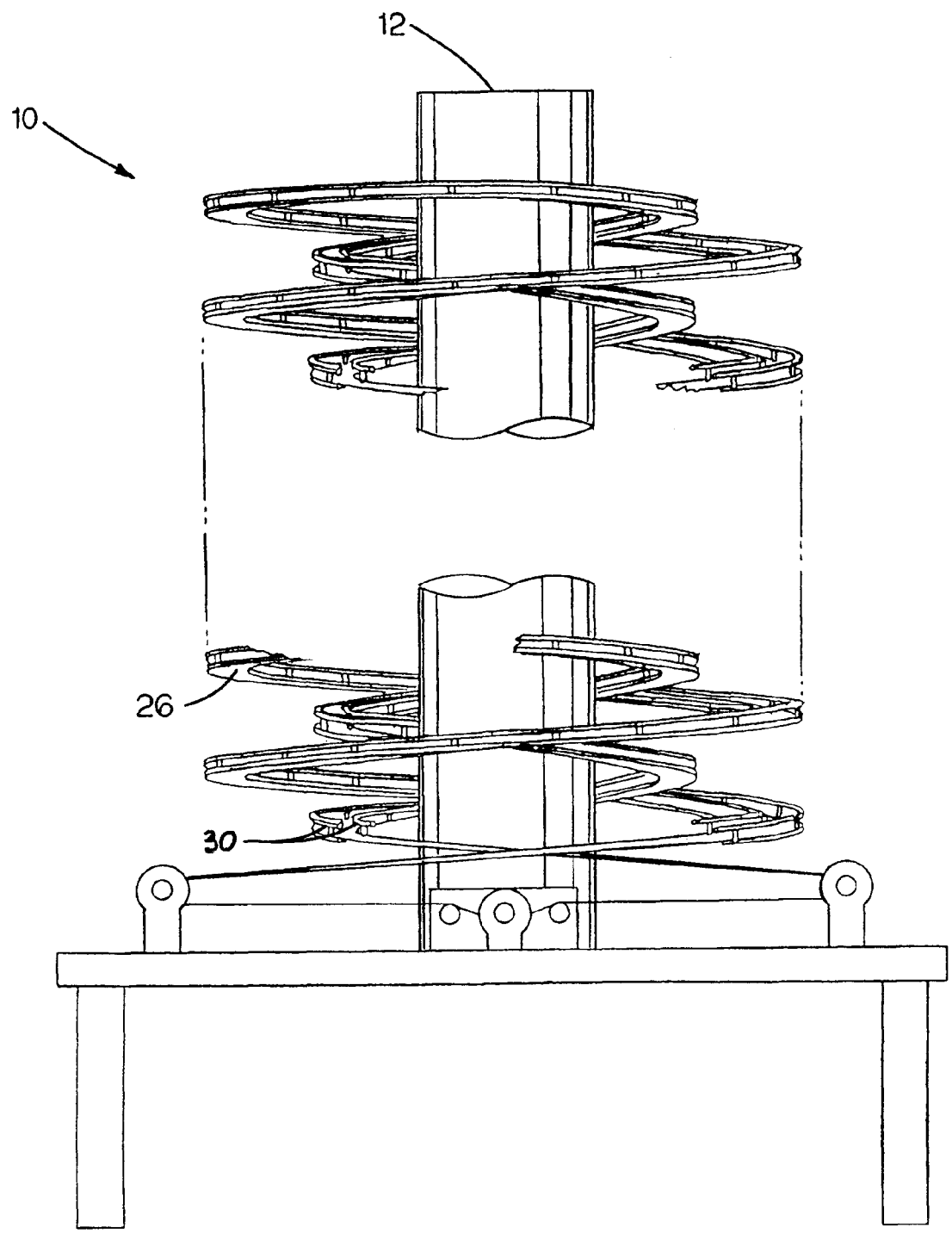
FIG. 3 is a partial side view of the spiral belt conveyor of FIG. 1 with side rails.

A helical track 26 is mounted about the central frame structure 12, as shown, and a conveyor belt 24 rides within the helical track 26. The track 26 may be freestanding or may be supported by braces extending between the track 26 and the central frame structure 12. The track 26 may comprise parallel helical side rails 30 (FIG. 3) with rows of smooth idler rollers between the rails. The rails may form sidewalls high enough to retain the belt 24 on the track 26 or to prevent conveyed articles from falling off the sides of the belt, or each row of rollers may have outside sprocket wheels that engage chain links laterally disposed along the edges of the belt 24. Idler rollers 20, 22 are mounted on opposed ends of the platform 14, as shown in FIG. 2, with a drive unit 18 being mounted substantially centrally on the platform 14 for driving rotation of the conveyor belt 24. The conveyor belt 24, as shown, is mounted about the idler rollers 20, 22 adjacent the upper surface of the platform 14.

The tracks 26 are shown in the figures for exemplary purposes only and have been simplified for the sake of clarification. Spiral tracks for use with conveyor systems are well-known in the art, and any suitable kind of spiral or helical track may be used in the present inventive system. Conventional tracks typically do not include rollers the width of the track, nor do they include sprockets. Typical tracks are often formed as soft plastic guides for the conveyor belt, which are fixed to a steel conveyor frame to form the overall track structure. One such typical exemplary conveyor track is manufactured by Rexnord Industries, LLC. Another typical exemplary conveyor track is manufactured by Ryson International, Inc.

Figure 4:
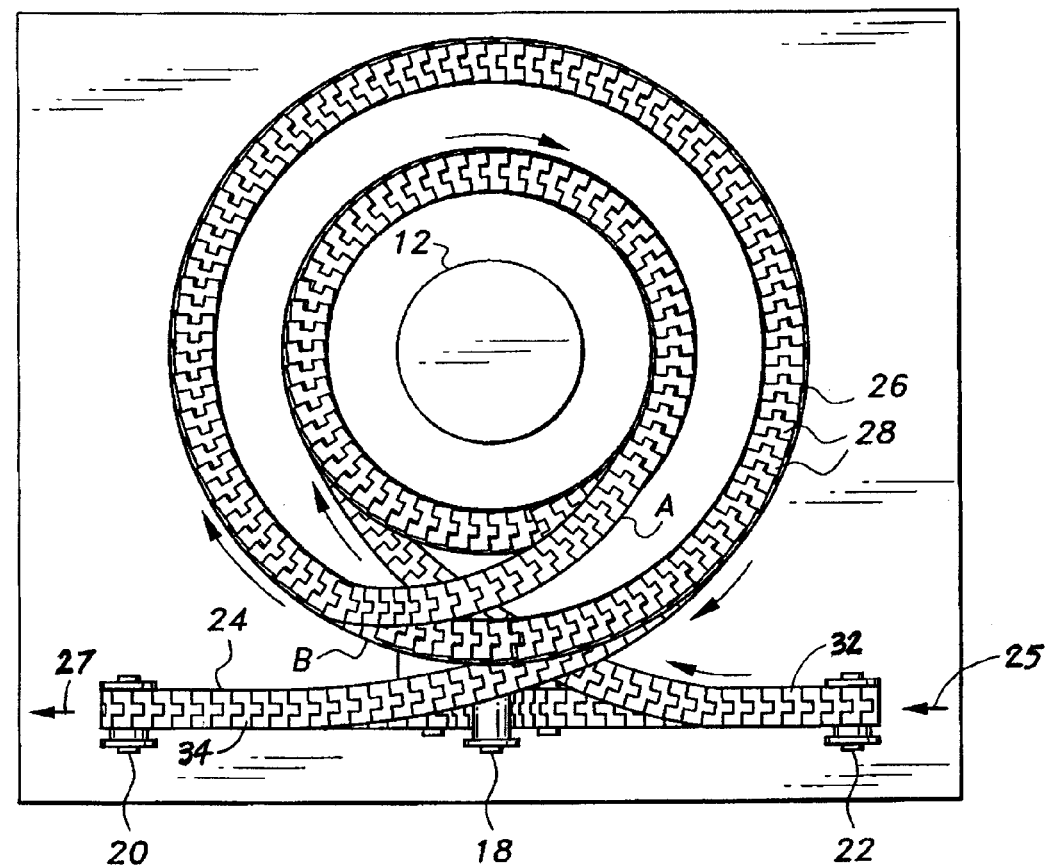
FIG. 4 is a top view of the spiral belt conveyor according to the present invention.

As best shown in FIG. 4, the conveyor belt 24 is preferably formed from a plurality of individual segments 28 joined together to form the belt 24, allowing the conveyor belt 24 to follow a substantially curved or helical path. Drive units for driving such linked conveyor belts are known in the art. Such systems are shown in U.S. Pat. Nos. 6,550,602 and 5,743,376, which are herein incorporated by reference in their entirety.

In use, articles are placed on the conveyor belt 24 along a first linear track segment 32 on the right-hand side in the configuration illustrated in FIG. 2, as indicated by directional arrow 25. The first linear track segment extends to the helical track 26 from the segment's distal end at the idler roller 22. The conveyor belt 24 then follows the track 26 along an upward helical path about the central frame structure 12. As shown, the upward path has a radius $R_1$. At the upper end of the central frame structure 12 (i.e., attaining a height $H_1$), the track 26 extends to reach the increased radius $R_2$, and the conveyor belt 24 follows a downward helical path at the increased radius $R_2$ (the transition between the inner radius and the outer radius is indicated at A in FIG. 4). The top view of FIG. 4 illustrates the transition of the track 26 and the belt 24 from the first radius $R_1$ to the second radius $R_2$. After passing to the larger radius, the belt then begins a downward path around the larger radius (region B in FIG. 4 indicates the first full circumference of motion in the downward, helical path). At the bottom of the central frame structure 12, the articles are discharged from the belt 24 for removal, as indicated by directional arrow 27 along a second linear track segment 34 extending outward from the lower end of the downward path to the idler roller 24 at the track segment's distal end. The first and second linear track segments 32, 34 are collinear in this example, and the drive unit 18 is in line with them.

Figure 7:
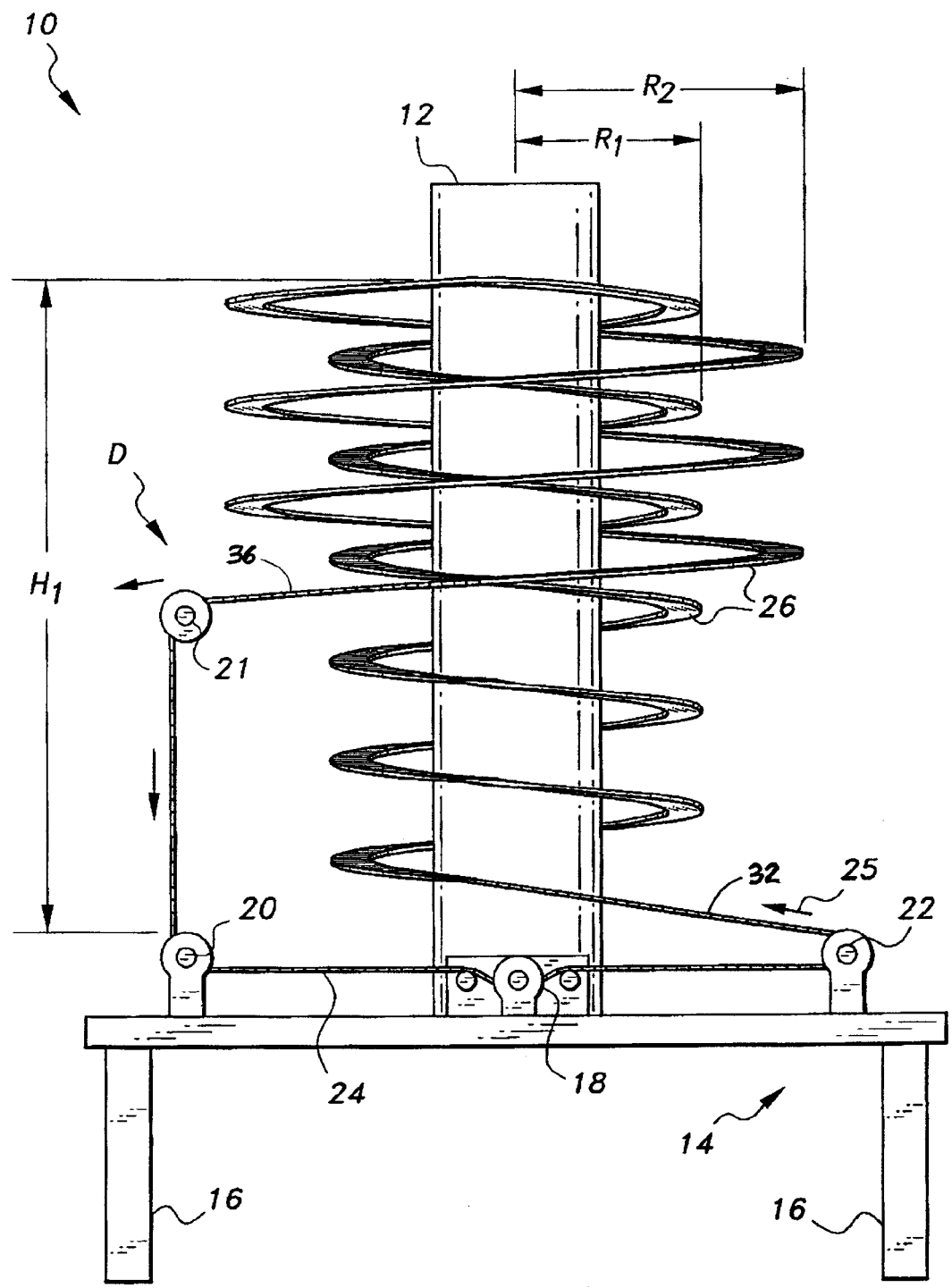
FIG. 7 is a side view of another alternative embodiment of the spiral belt conveyor according to the present invention.

Alternatively, discharge chutes, shelves, collection boxes, or other receivers may be arranged vertically about the outer portion of the track 26, allowing the articles to be deposited at other locations at different heights, depending upon the application. Such an alternative arrangement is shown in FIG. 7, in which the spiral belt conveyor of FIG. 2 includes an outer track portion 26 connected to an elevated linear track segment 36 that terminates in an upper roller 21 elevated above the platform 14. In this arrangement, the belt continues vertically downward from the upper roller 21, to complete the overall loop, and articles may be removed at discharge point D. The height of discharge point D may be varied, as desired. In this example, vertical projections of the first linear track segment 32 and the elevated linear track segment 36 are collinear.

Figure 5:
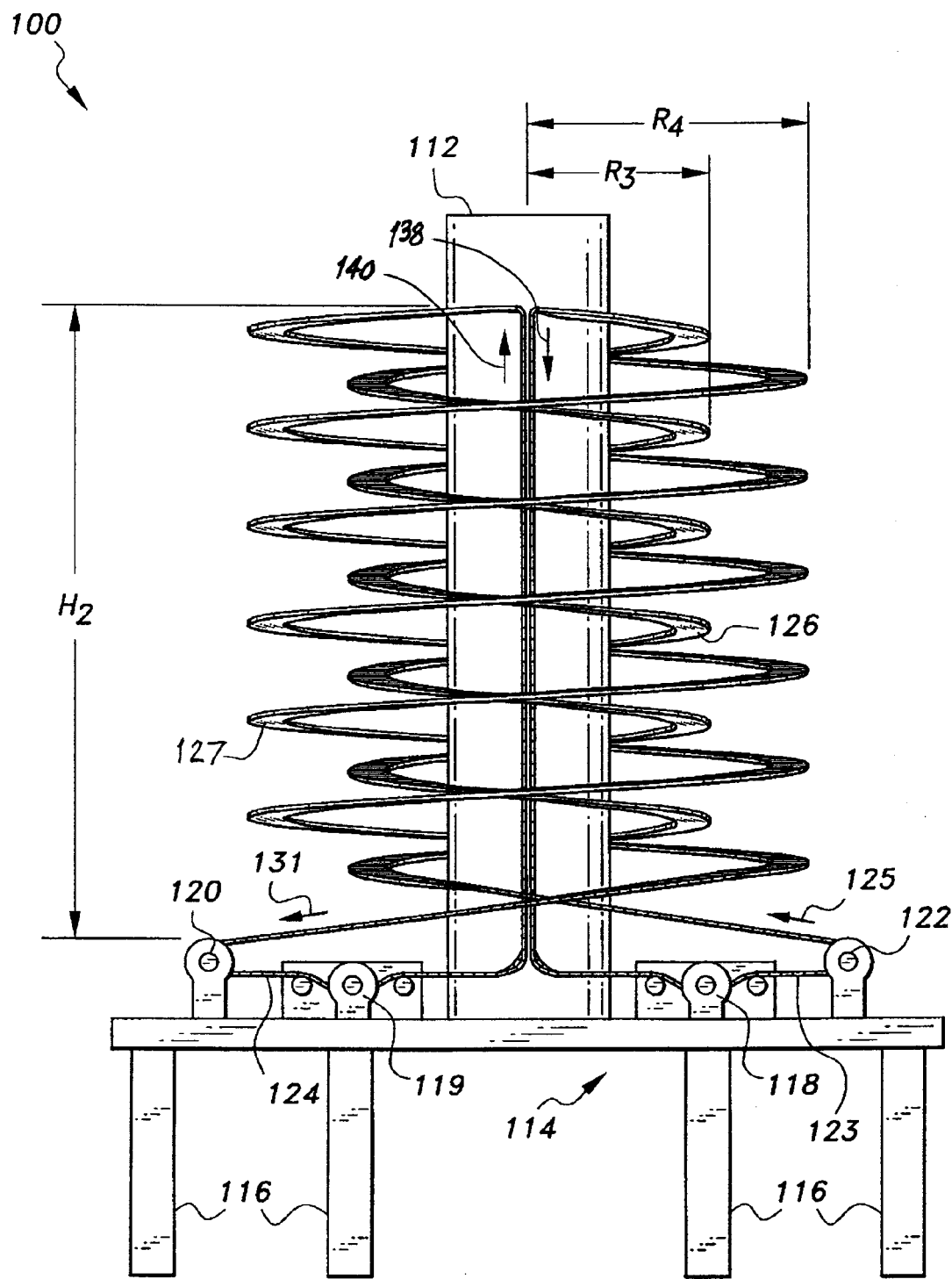
FIG. 5 is a side view of an alternative embodiment of a spiral belt conveyor according to the present invention.
Figure 6:
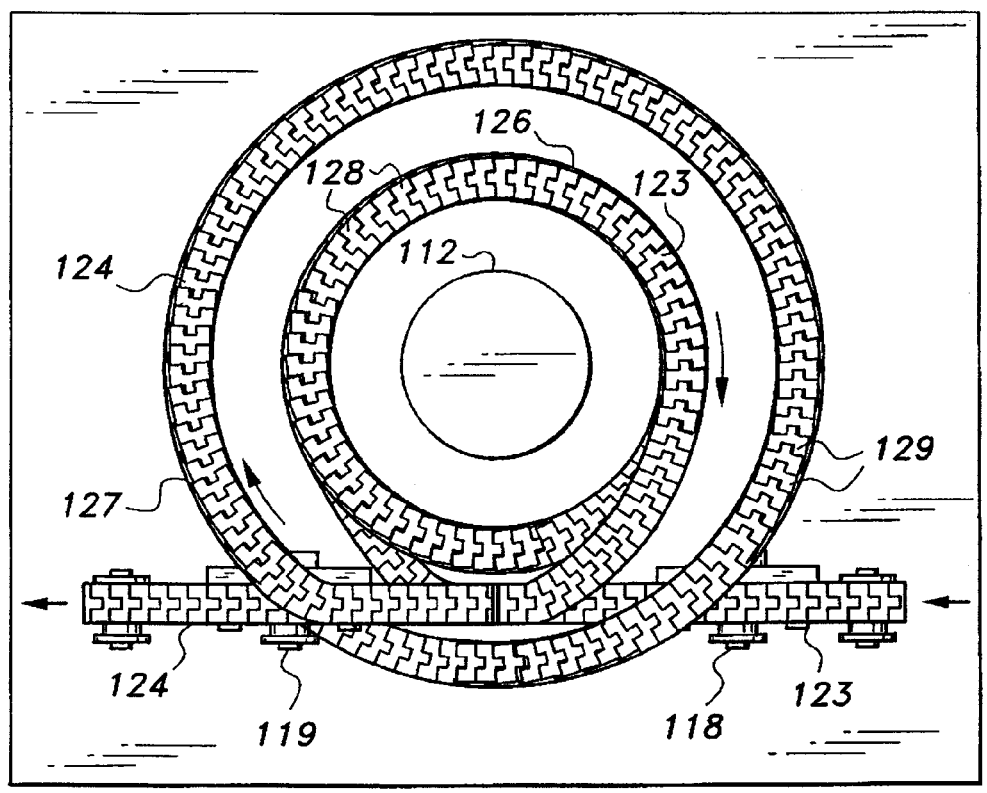
FIG. 6 is a top view of the spiral belt conveyor of FIG. 5.

In the alternative embodiment of FIGS. 5 and 6, the spiral belt conveyor 100 includes a platform 114, similar to the platform 14 of FIGS. 1-4, for mounting on a support surface, such as the floor. The platform 114 preferably includes a plurality of support legs 116, as shown. A central frame structure 112 is mounted to and extends upwardly from an upper portion of the platform 114. The central frame structure 112 has a height $H_2$ that defines the maximum height above the platform 114 that articles on the conveyor 100 can reach.

In the embodiment of FIGS. 1-4, a single helical track 26 and a single conveyor belt 24 were used. In the embodiment of FIGS. 5 and 6, two tracks 126, 127 are included to support a pair of belts 123, 124. The inner track 126 follows a substantially helical path and has a first radius $R_3$. Similarly, the outer track 127 follows a substantially helical path and has a second radius $R_4$, with $R_4$ being greater than $R_3$. Each of the tracks 126, 127 is mounted about the central frame structure 112, as shown, and the conveyor belts 123, 124 ride along the corresponding helical tracks 126, 127.

Two idler rollers 120, 122 are mounted on opposed ends of the platform 114, as shown in FIG. 5, with a pair of drive units 118, 119 being mounted substantially centrally on the platform 114 for driving rotation of the conveyor belts 123, 124, which are mounted on respective idler rollers 120, 122. Similar to the description of FIGS. 1-4, and as shown in FIG. 6, the conveyor belts 123, 124 are each preferably formed from a plurality of individual segments 128, 129, which are joined together, allowing the conveyor belts 123, 124 to follow substantially curved or helical paths.

In use, articles are placed on the first conveyor belt 123 on the right-hand side in the configuration illustrated in FIG. 5, as indicated by directional arrow 125. The conveyor belt 123 follows the first track 126 along an upward helical path about the central frame structure 112. As shown, the upward path has a radius $R_3$. Upon reaching the upper end of the central frame structure 112 (i.e., attaining a height $H_2$), the upper end of the first track 126 meets the upper end of the second track 127.

In FIGS. 5 and 6, where the first belt 123 meets the second belt 124, the second belt 124 proceeds to follow a downward vertical path 138 from the upper ends of the helical paths to the lower ends. The articles pass from the first belt 123 to the second belt 124 at this point. The second belt 124 is carried by the second track 127, which has a greater radius $R_4$, and the conveyor belt 124 follows a downward helical path at the greater radius $R_4$. At the bottom of the central frame structure 112, the articles are discharged from the belt 124 for removal, as indicated by directional arrow 131. The second belt wraps around the idler roller 120, is engaged by the second drive unit 129, and runs along an upward vertical path 140 closely spaced from the downward vertical path of the other belt.

Figure 8:
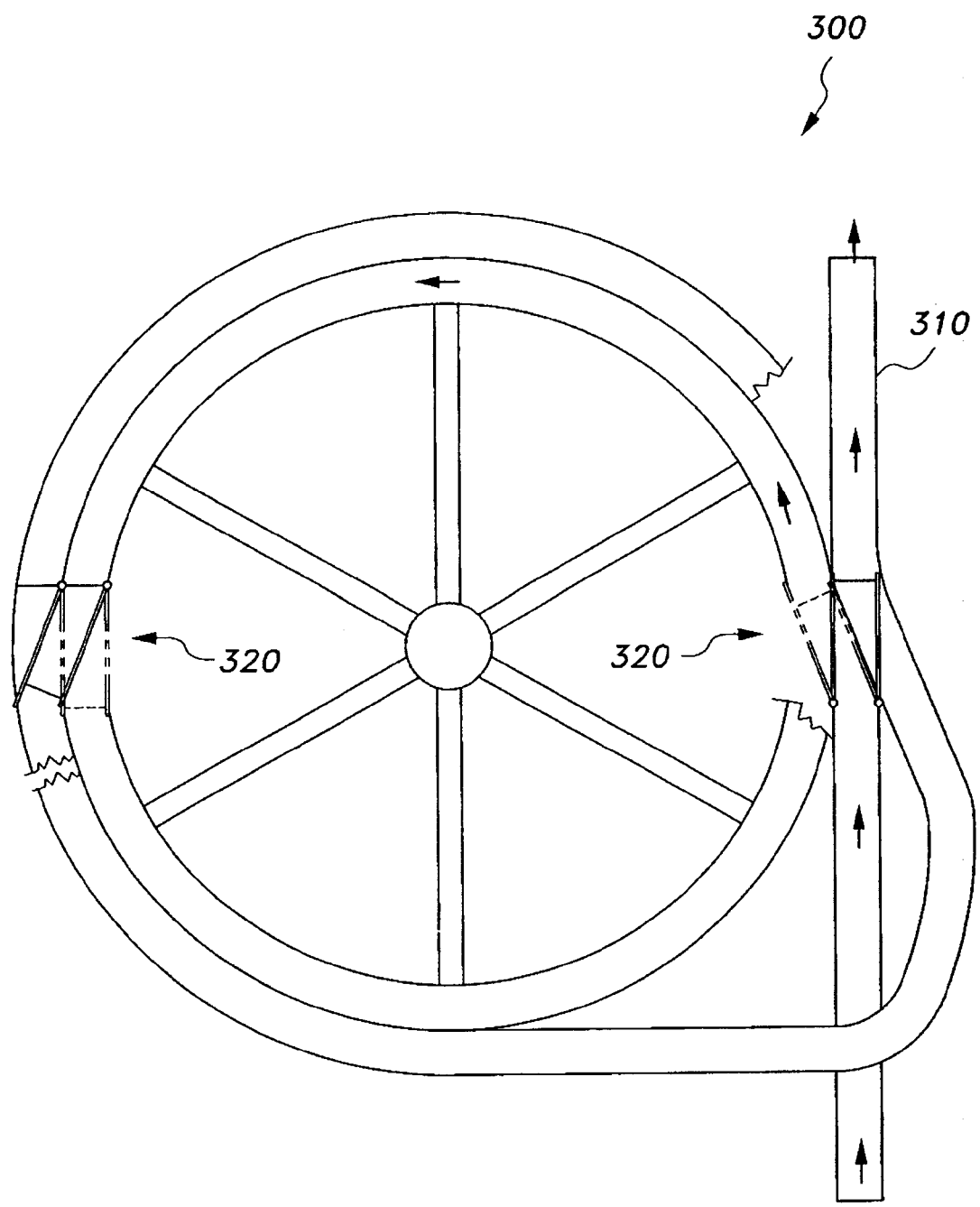
FIG. 8 is a schematic top view of an alternative embodiment of the spiral belt conveyer according to the present invention.

It should be understood that additional elements for the transmission, conveyance, and sorting of articles may be added to the above systems without departing from the spirit or scope of the invention. For example, switch gates are well-known in the field of powered conveyance and may be added to the above spiral belt conveyor embodiments. Exemplary switch gates are taught in U.S. Pat. Nos. 7,222,714; 5,724,785; and 5,613,591, all of which are herein incorporated by reference in their entireties. In the schematic view of FIG. 8 system 300 includes a pair of switch gates 320 provided along spiral belt 310, allowing the user to selectively bypass the conventional helical route, and change the direction of conveyance at a selected point.

It is to be understood that the present invention is not limited to the embodiments described, but encompasses any and all embodiments within the scope of the following claims.

What is claimed is:

1. A spiral belt conveyor comprising:
an upwardly extending central frame structure having an upper end and a lower end;
a helical track concentrically disposed around the central frame structure, the helical track defining an inner helical path and an outer helical path, the inner helical path having a smaller radius than the outer helical path, the inner and outer helical paths each having an upper end and a lower end, the upper ends meeting at the upper end of the central frame structure;
a first linear track segment leading to the helical track at the lower end of the inner helical path;
a second linear track segment leading to the helical track at the lower end of the outer helical path, wherein the first and second linear track segments are collinear in a vertical projection;
at least one conveyor belt mounted on the helical track and the first and second linear track segments;
at least one drive unit disposed in line with the first and second linear track segments and driving the conveyor belt upward or downward on the inner helical path and oppositely on the outer helical path.

2. A spiral belt conveyor as in claim 1 further comprising a pair of idler rollers around which the at least one conveyor belt is trained, wherein the idler rollers are disposed at ends of the first and second linear track segments distal from the helical track.

3. A spiral belt conveyor as in claim 1 wherein the at least one conveyor belt is driven upward on the inner helical path and downward on the outer helical path.

4. A spiral belt conveyor as in claim 1 further comprising a side rail running along the helical track.

5. A spiral belt conveyor as in claim 1 further comprising side rails running along both sides of the helical track.

6. A spiral belt conveyor as in claim 1 wherein the second linear track segment is elevated above the first linear track segment.

7. A spiral belt conveyor as in claim 1 wherein the at least one conveyor belt comprises first and second conveyor belts and wherein the at least one drive unit comprises first and second drive units and wherein the first conveyor belt is mounted on the outer helical path and is driven by the first drive unit disposed along the first linear track segment and wherein the second conveyor belt is mounted on the outer helical path and is driven by the second drive unit disposed along the second linear track segment.

8. A spiral belt conveyor as in claim 7 wherein the first conveyor belt and the second conveyor belt follow closely spaced vertical paths between the upper and lower ends of the central frame structure in opposite directions.

9. A spiral belt conveyor comprising:
a platform having an upper surface;
a central frame structure extending upwardly from the upper surface of the platform from a lower end to an upper end;
a pair of idler rollers mounted on the upper surface of the platform;
a track segment disposed between the pair of idler rollers;
a helical track concentrically disposed around the central frame structure, the track defining an inner helical path and an outer helical path, the inner helical path having a smaller radius than the outer helical path, the inner and outer helical paths each having an upper end and a lower end, the upper ends meeting at the upper end of the central frame structure;
a drive unit disposed between the pair of idler rollers along the track segment; and
a conveyor belt mounted on the helical track, the idler rollers, and the drive unit, the conveyor belt being driven upward on the inner helical path and downward on the outer helical path by the drive unit along the track segment.

10. A spiral belt conveyor as in claim 9 further comprising a side rail running along the helical track.

11. A spiral belt conveyor as in claim 9 further comprising side rails running along both sides of the helical track.

12. A spiral belt conveyor as in claim 9 wherein the lower end of the outer helical path is elevated above the lower end of the inner helical path.

13. A spiral belt conveyor comprising:
a platform having an upper surface;
a central frame structure extending upwardly from the upper surface of the platform from a lower end to an upper end;
first and second idler rollers mounted on the upper surface of the platform;
first and second helical tracks concentrically disposed around the central frame structure, the first helical track defining an inner helical path and the second helical track defining an outer helical path, the inner helical path having a smaller radius than the outer helical path, the inner and outer helical paths each having an upper end and a lower end, the upper ends meeting at an upper end of the central frame structure;
first and second drive units;
a first conveyor belt mounted on the first helical track, the first drive unit, and the first idler roller, the first conveyor belt being driven upward on the inner helical path by the first drive unit; and
a second conveyor belt mounted on the second helical track, the second drive unit, and the second idler roller, the second conveyor belt being driven downward on the outer helical path by the second drive unit.

14. A spiral belt conveyor as in claim 13 wherein the first conveyor belt and the second conveyor belt follow closely spaced vertical paths between the upper and lower ends of the central frame structure in opposite directions.

15. A spiral belt conveyor as in claim 13 further comprising side rails running along both sides of the first and second helical tracks.

* * * * *